United States Patent

Barry et al.

[11] 3,871,811
[45] Mar. 18, 1975

[54] APPARATUS FOR APPLYING HEATING AND COOLING MEDIA TO MOLD PLATE

[75] Inventors: Martin J. Barry, Westport, Conn.; Elon J. Nobles, Minnetonka, Minn.

[73] Assignee: Edward J. Cabic, Falls Church, Va.; a part interest

[22] Filed: June 25, 1973

[21] Appl. No.: 373,138

[52] U.S. Cl. ............... 425/407, 425/384, 266/45
[51] Int. Cl. ............................................. B29c 3/00
[58] Field of Search ........ 425/407, 384; 266/45, 6 S

[56] References Cited
UNITED STATES PATENTS

| | | | |
|---|---|---|---|
| 7,515 | 7/1850 | Touscott | 266/6 S |
| 643,278 | 2/1900 | Sponsel | 266/6 S |
| 871,931 | 11/1907 | Hansen | 266/6 S |
| 2,009,078 | 7/1935 | Ziska | 266/6 S X |
| 3,423,254 | 1/1969 | Safford et al. | 266/6 S X |
| 3,581,809 | 6/1971 | DeWeese et al. | 425/407 X |
| 3,753,635 | 8/1973 | Barnett | 425/384 X |

*Primary Examiner*—Robert L. Spicer, Jr.
*Attorney, Agent, or Firm*—Edward J. Cabic

[57] ABSTRACT

A mold plate for applying heating and cooling fluids to a layer of plastic material comprising a chamber with spaced apart plates in which the first plate contacts the plastic and the heat transfer fluid flows through the chamber. Tubes extend between the plates. They serve a primary purpose to seal the mold plate holes so as to retain the heat transfer fluid internally within the mold plate system. These tubes serve a secondary purpose to supply additional cooling fluid to the plastic. Two mold plates may be positioned on each side of the plastic layer to form a molding press.

10 Claims, 6 Drawing Figures

3,871,811

APPARATUS FOR APPLYING HEATING AND COOLING MEDIA TO MOLD PLATE

BACKGROUND OF THE INVENTION

1. Field of the Invention

The present invention relates to an apparatus for applying heating and cooling media directly to mold plates of opposed mold systems for thermo-forming plastic panels so as to achieve a high efficiency in cycle time for heating and cooling and to minimize the heat requirement and further to facilitate mold release from the thermo-formed panel.

2. Description of the Prior Art

There are known processing techniques in which plastic panels are produced by the application of heat followed by cooling through mold plates between which the desired plastic media is placed. By suitable manipulation of the mold systems during the heating cycle the plastic is thermally formed to the desired geometric shape of the ultimate finished panel. This is followed by a cooling cycle which is required to stabilize the three dimensional shape of the plastic panel and to effect the release of the panel from the mold.

In current practice, these mold systems may consist of blocks of metal in which the pattern has been machined into the surface. The blocks of metal are thick enough so that passages drilled through the blocks parallel to the mold face permit the application of heat by media such as hot vapors or liquids or by insertion of electrical heaters. Following the heating cycle, cooling is accomplished by injection of water or other cooling media through separate passages. Such systems have the undesirable characteristics of having large masses of metal to be heated and cooled, of having uneven heat distribution due to the application of the heating and cooling media at spaced locations, and of having difficulty in handling the heavy molds during the production operation since these heavy molds must be opened and closed. Use of these heavy blocks leads to inefficiency and to high heat loss since it is necessary during the heating step to heat all of the metal up to the heating media temperature and then during the subsequent cooling step it is necessary to also cool this large mass of heated metal in addition to cooling the panel which has been formed.

Another form of mold system in current practice consists of metal sheets which are either punched or drilled in the desired pattern. Plastic is formed in a panel between the mold sheets while the application of heat and cooling is done by means of plattens superimposed on the opposite sides of the mold sheets from the plastic panel. These plattens are heated and cooled by circulating heating and cooling media at appropriate intervals in the overall production cycle through coils or passageways located in the plattens themselves. The application of heating and cooling must, therefore, pass through the platten, across a thin air boundary, and then into the mold plate which will be in contact with the plastic. This is inherently an inefficient heat transfer system in that the heat must first be applied to the platten, it must then pass through the imperfect contact with the mold plate formed by the thin heat transfer resistant air barrier before the heat can be delivered to the mold plate and then to the plastic to be molded. Furthermore, the excessive mass of metal, of which the platten is composed, must also be heated and cooled, which leads to a high heat loss and low operating efficiency due to an extended cycle time.

SUMMARY OF THE INVENTION

The apparatus according to the present invention has the distinctly unique feature of applying the heating and cooling media directly to the mold plate itself. It thereby provides direct heat transfer in a uniform manner, it minimizes the heat requirement and it provides for the most efficient heat transfer rate during the heating and particularly during the cooling part of the overall cycle that is possible. It provides a much higher level of efficiency than is possible by any of the previously discussed systems. Additionally, it provides for the introduction of a mold release media which itself can provide a cooling function through the tubular section of the mold system.

The apparatus comprises as one side of a mold system a pair of spaced plates of which at least the first plate has good heat transfer characteristics and is placed adjacent to the plastic layer to be formed. Walls surround the plates to define a chamber through which heating and cooling media can flow in order to heat and cool the mold plate in contact with the plastic material which in turn thermally forms the plastic panel. A plurality of tubes are placed between the two plates and into the plates through holes in the plates so that as a primary function the transfer fluid can be in direct contact with the mold plate but be retained internally in a fluid tight system. After the plastic panel has been formed the tubes can be used in a secondary manner in that the panel can be cooled and set quickly by additional cooling media which is supplied through these tubes for direct contact with the formed, hot plastic panel.

According to another feature of the invention, a chamber can be placed over the second plate spaced from the plate in contact with the plastic so that the additional cooling media employed in the quick cooling step can be supplied to this chamber and be uniformly distributed to all of the tubes for delivery to the hot plastic panel.

According to another feature of the invention a layer of insulating material can be placed in the chamber between the two spaced plates and next to the second plate which is spaced from the first plate in contact with the plastic in order to insulate the inner side of the second plate and to prevent heat losses through this second plate which is not in contact with the plastic.

According to a further feature of the invention, the first plate in contact with the plastic can be chamfered at the opening where the tubes are inserted into the plate and drainage channels can be cut into the chamfer and outer contacting side of the first plate in order to allow the cooling media flowing through the tubes in the cooling cycle to be removed.

According to a further feature of the invention, two pairs of these spaced heated and cooled mold system plate assemblies can be arranged on each side of the plastic material with positioning means connected to each plate in order to regulate the spacing between the two plates before, during, and after the forming process.

BRIEF DESCRIPTION OF THE DRAWINGS

Referring to FIG. 1, the essential features of the invention are illustrated. The top mold plate structure is shown in perspective as unit 10, and it comprises as the lower part an enclosed chamber 12. Chamber 12 is constructed of a first plate 14, the mold plate itself, which will be in contact with the plastic to be molded and a second plate 16 spaced from plate 14. These two plates are connected with a front plate 18 and rear plate 20 while the ends are sealed with end plate 22 and end plate 24, which is not illustrated.

Figure 1:
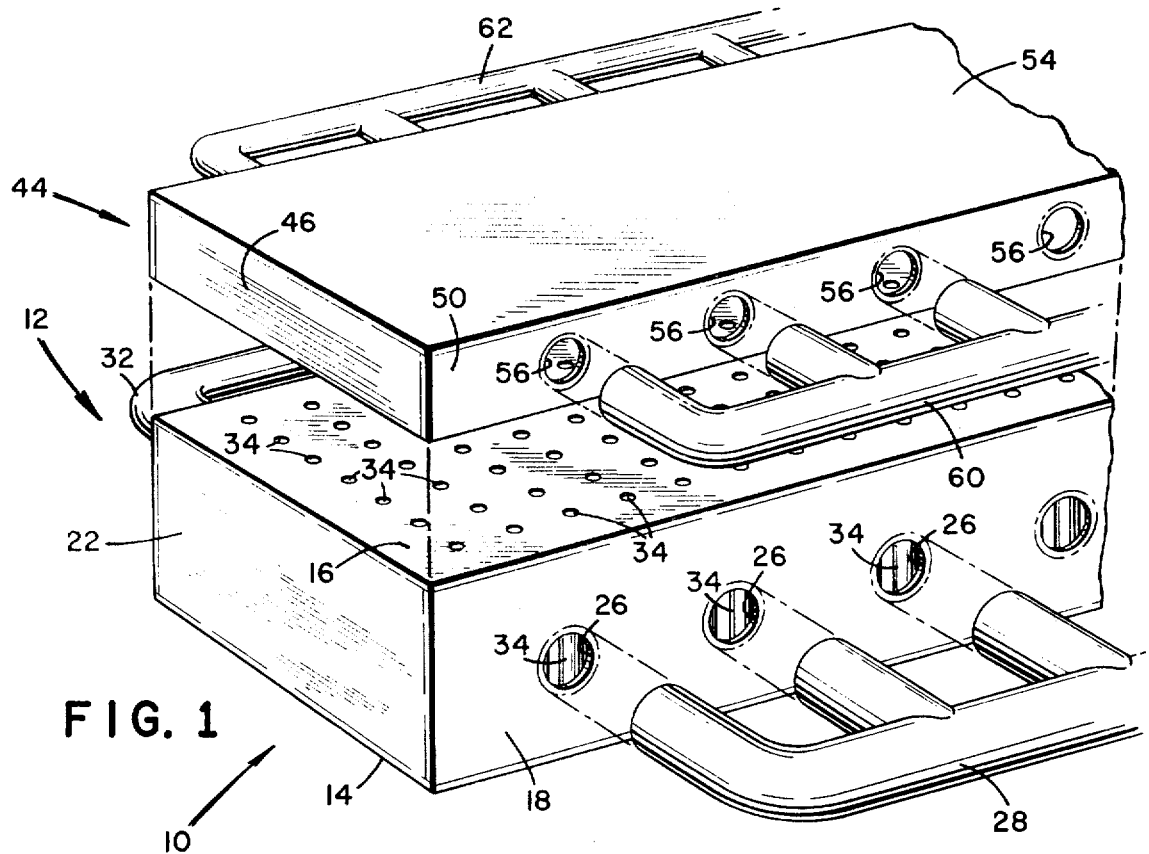
FIG. 1 is a perspective view of the heating and cooling plate according to the invention showing the manifolds and cover chamber.
Figure 2:
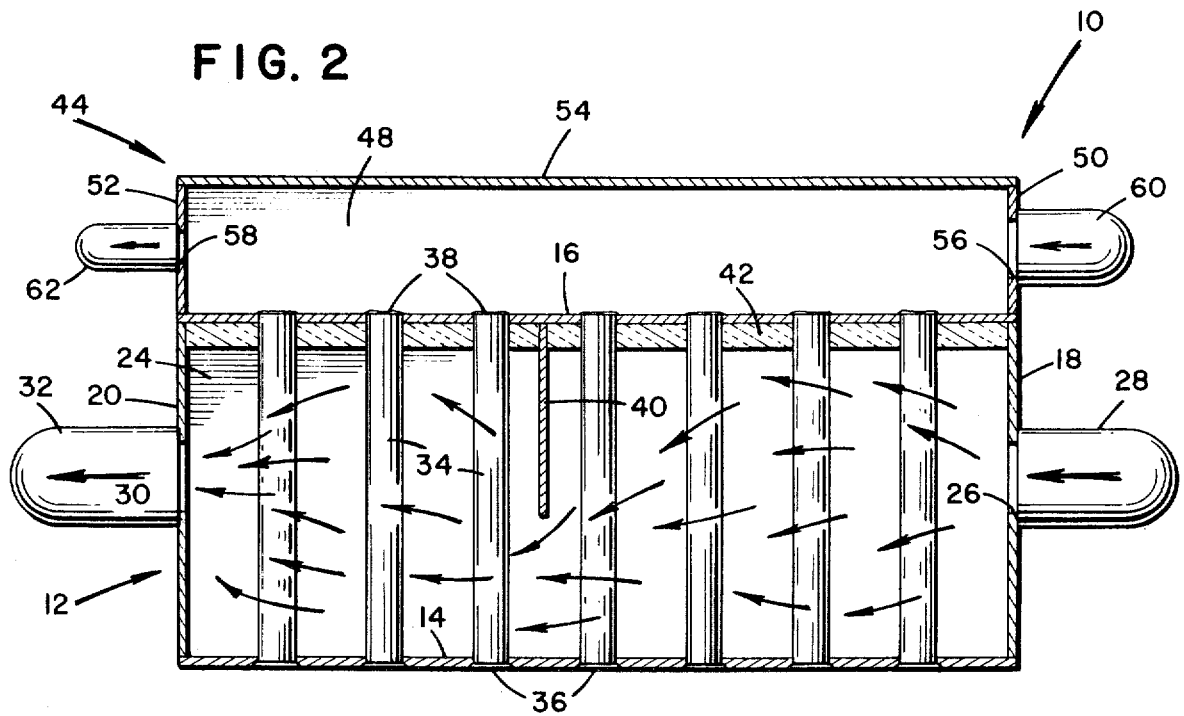
FIG. 2 is a cross-section of FIG. 1, including manifold elements.

Fluid entry ports 26 are located in the front wall 18 to allow heating or cooling media to enter. These ports may optionally be connected by a manifold 28 to aid in directing the heat transfer media into the ports 26 of chamber 12. In the back wall 20, opposite to plate 18, are also located ports 30 to allow the heat transfer media to leave the chamber 12. These ports 30 may also be optionally connected to an exit manifold 32 to carry off the media to a heating and cooling device not shown so that the fluids may be recycled if desired.

Between the plates 14 and 16 are a plurality of tubes 34 which are in open communication with holes 36 in plate 14 and holes 38 in plate 16. The ends of tubes 34 are sealed to the plates in a fluid-tight engagement such as by welding in order that the heating and cooling fluid in chamber 12 does not leak out. Baffles such as baffle plate 40 may be placed within chamber 12 in order to insure that the heating and cooling fluid is in turbulent flow and that it continually contacts the heat conductive surface of plate 14 which is in contact with the plastic sheet being molded. The plate 14 may be made of metal such as steel.

To insure that a maximum of the heat from the heating fluid is transferred to the plastic material to be molded, insulating material 42 may be inserted inside chamber 12 against plate 16 to minimize the heat loss through upper second plate 16.

The hollow tubes 34 allow additional cooling fluid to flow through them which can contact the molded plastic article. As seen in FIG. 1, by merely having the tube openings in upper plate 16 exposed, it will be possible to supply supplemental cooling fluid such as by injecting air or spraying cooling water or other cooling fluids over the surface of plate 16 with a hose. In another embodiment, each of the tubes could be individually connected to an individual hose in order to direct cooling fluid into the tubes.

A preferred embodiment of the present invention utilizes an additional chamber to direct the supplemental cooling media through the tubes. As seen in the exploded view in FIG. 1, this top chamber 44 comprises end wall 46 and end wall 48, not shown, with front wall 50 and back wall 52. The upper chamber is sealed with top plate 54, and this chamber is congruent with the lower chamber 12.

The top chamber 44 is provided with inlet ports 56 in front wall 50 in order to supply the supplemental cooling liquid to the chamber. Outlet ports 58 are located in back wall 52 in order to insure that there is a constant flow of cooling media through the top chamber 44 so that there will be no stagnation of cooling media in the chamber. These outlets may be smaller than the inlets in order that the media will be directed downwardly through the tubes 34. The inlet and outlet ports 56 and 58 may also be connected respectively with an inlet manifold 60 and an outlet manifold 62 to direct the supplemental cooling media to and from the ports.

Figure 3:
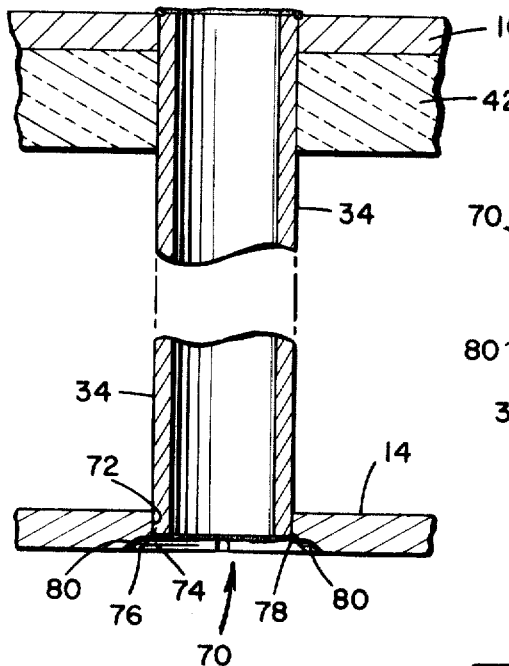
FIG. 3 is a detailed view of a tube 34, shown in FIG. 2.
Figure 4:
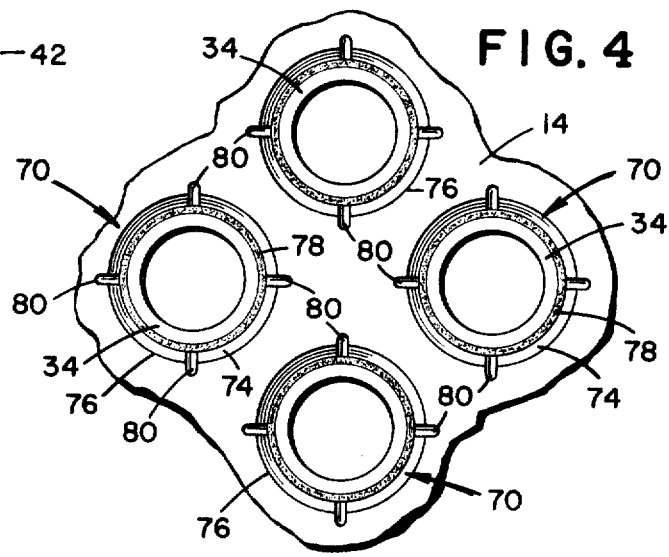
FIG. 4 is an enlarged partial view of the bottom of mold plate 14, and includes a bottom view of FIG. 3.

The construction of the tubes 34 extending between plates 14 and 16 is shown in detail in FIG. 3. Each tube extends upwardly through plate 16 where it can be sealed with the plate by welding or by soldering. In the bottom plate 14, which is in contact with the plastic to be molded, the tube 34 may just extend part way through the plate 14 as shown in FIG. 3. Here the tube opening assembly 70 consists of plate 14 which has a hole 72 drilled with the outside diameter of tube 34 drilled through it. The bottom side has a chamfer 74 concentric to hole 72 and extending into plate 14 with an outer diameter 76 at the surface of the plate. Around the chamfer additional slits are cut into the plate to form grooves 80 as seen in FIG. 4. The tube 34 is placed in hole 72 part way into plate 14 to the region where the chamfer extends and the end of the tube is sealed to plate 14. One way to seal the end of the tube is by welding the end as shown at 78. The plurality of grooves 80 extending through the chamfer into plate 14 will allow the supplemental cooling media flowing down tube 34 to flow out along the bottom of plate 14.

FIG. 4 shows a bottom view of plate 14 with four tubes 34 extending into the plate with concentric chamfers 74 and four grooves 80 extending through the chamfers.

Figure 5:
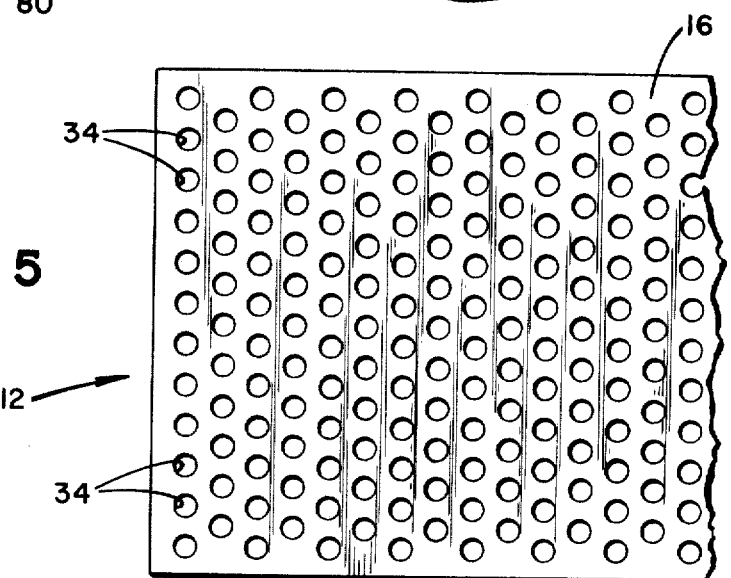
FIG. 5 is a larger, representational view of the bottom of mold plate 14.

FIG. 5 illustrates a more extensive view of the bottom of the plate 14 showing the many tubes 34 which extend through the plate. This figure illustrates a staggered arrangement which may be used in positioning the tubes. Other patterns can be used, including rectangular grids or various other geometric patterns such as triangular configurations.

The discussion so far relating to FIGS. 1–5 has been with regard to the single unit which can be used to apply both heating and cooling to a substrate to be heated while also providing supplemental cooling media to aid in the final cooling and release of the plastic article.

Figure 6:
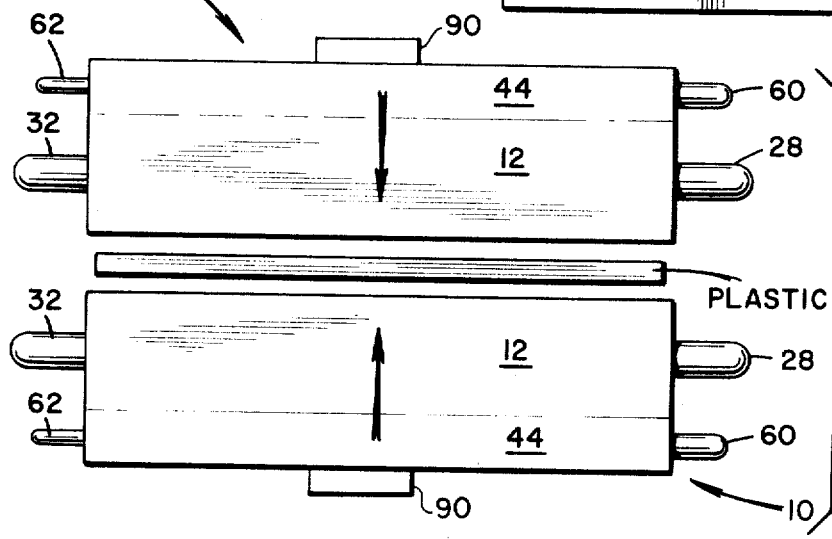
FIG. 6 illustrates a press arrangement in which two thermo-forming units are arranged on each side of a plastic sheet to be molded.

FIG. 6 illustrates a press arrangement which can be employed using two of these units 10. Each unit is arranged so that its bottom first plate 14 is in contact with the layer of plastic to be molded. Auxiliary means schematically illustrated as 90 on each side of the units 10 can be employed to move the two units apart while the plastic layer is inserted and then the auxiliary means can be employed to move the two units together under controlled degrees of pressure. These auxiliary means will also move the units apart as desired so that the final plastic molded article can be removed.

In summary, this invention provides the following advantages:

1. Direct application of heating and cooling media directly to the mold face plate itself.
2. It effects the maximum possible heat transfer rate.
3. Minimum mass of metal has to be heated and cooled.
4. Overall time cycle for heating and cooling is brought to an absolute minimum and the production rate is maximized for the production of panels.
5. Injection of mold release and secondary cooling media through the tubes is a unique feature which in itself aids in removal of the product from the mold system and hastens the cooling time, thereby again improving the rate at which the product is made.

The above description sets forth examples of various embodiments of the invention. This invention, of course, should not be construed as being strictly limited by the specific forms of the embodiments described and illustrated herein, since various modifications may be brought thereto without departing from the spirit and scope of the invention as set forth in the appended claims.

We claim:

1. A mold plate adapted for applying heating and cooling fluids to a layer of plastic material to form a plastic panel comprising:
   a. a pair of spaced apart plates consisting of a first plate and a second plate wherein the first plate which engages the plastic material is made of a material having good heat transfer properties;
   b. wall means connecting the edges of said plates to form a fluid-tight chamber between said plates;
   c. inlet and outlet means within said walls to allow a heat-transfer media to enter and exit from said chamber; and
   d. a plurality of open ended tubes extending between and into the two plates, said tubes being in a fluid-tight relation with said plates so that the media within said chamber cannot escape through said plates to provide additional fluid to the face of the mold.

2. A mold plate system according to claim 1, wherein the tubes only extend partially into the first plate and wherein the holes into which the tubes extend in the first plate are chamfered on the outer side of the first plate.

3. A mold plate system according to claim 2, wherein cuts are arranged in the chamfered surface of said first plate whereby fluid flowing through said tubes may escape between said plate and the contigious plastic panel.

4. A mold plate system according to claim 1, wherein a layer of thermal insulation is positioned between said two plates and adjacent said second plate.

5. A mold plate system according to claim 1, further comprising chamber means positioned over the outer side of said second plate with a fluid inlet means therein whereby fluid can be applied into all of said plurality of tubes extending into said second plate.

6. A mold plate system according to claim 5, further comprising a fluid distributing means arranged externally to said fluid inlet means to distribute heat transfer media to said inlet.

7. A mold plate system according to claim 1, further comprising distributing means within said chamber to distribute the fluid across said first plate.

8. A mold plate system according to claim 7, wherein said distributing means is at least one baffle.

9. A mold plate system according to claim 1, further comprising fluid distributing means arranged externally to said inlet and outlet means to distribute heat transfer media to said inlets and outlets.

10. A molding device for forming plastic panels comprising a pair of spaced apart plate molds as defined in claim 1 and means to control the spacing of said molds.

* * * * *